Patented Aug. 24, 1948

2,447,726

UNITED STATES PATENT OFFICE 2,447,726

LECITHIN COMPOSITION

Wilber J. Allingham, Denver, Colo.

No drawing. Application September 21, 1945,
Serial No. 617,931

5 Claims. (Cl. 99—15)

This invention relates to a lecithin compound for use in food and bakery products and all compositions of matter in which it is desired to employ the qualities of lecithin.

Lecithin has many uses but due to its physical and chemical properties it is difficult to intermix the lecithin in compositions in order to make use of its valuable qualities. It has been long known for instance, that lecithin, when incorporated with the ingredients of bakery wares, has a surprising result in that it greatly increases the richness and shortness so as to produce a product with increased oven-spring, increased volume, reduced weight and improved color. These improvements appear to be due to the fact that the lecithin acts as a dispersing agent for the shortening so that maximum results are obtained therefrom.

It has been almost impossible, however, to take advantage of these desirable qualities of lecithin due to the fact that lecithin is a heavy, thick, sticky liquid. It is almost impossible to mix this thick, sticky liquid with the flour and other baking ingredients since the powdered materials simply cake on and form balls of the lecithin.

The principal object of this invention is to provide a dry powdered compound of lecithin which can be readily and uniformly mixed with dry flour or other ingredients.

It has also been difficult to take advantage of the desirable qualities of lecithin due to its tendency to suddenly release the surface tension or viscosity of the dough resulting in increased density and decreased volume of the finished goods.

Another object of this invention is to provide means whereby the action of the lecithin will be retarded until the baking action has sufficiently advanced to avoid any "falling" of the dough.

Attempts have been made to form a more readily handled compound of the lecithin by intermixing it with granular products such as sugar, salt, etc., to form a relatively dry meal. These products have not been successful, however, since the flavors of the added ingredients change the flavor of the bakery products causing them to be either too salty or too sweet and the chemicals added interfere with the normal chemical reactions of the ingredients.

Another object of this invention is to provide a lecithin compound which can be readily intermixed with dry flour or other food products and ingredients; which will not impart any taste or odor to the final product; and which will not interfere with the natural chemical reactions thereof.

While particularly intended for dry intermixture, the improved lecithin compound can be readily intermixed with water, fats, oils, etc. with which it was formerly impossible or exceedingly difficult to mix lecithin and therein resides still another object of the invention.

The principal constituent employed in the improved compound is a dry, powdered, gel-forming carbohydrate known as "gelose" derived from sea plants and more particularly, gelose obtained from the well-known Irish moss harvested from the submarine beds along the Atlantic sea coast.

The gel-forming carbohydrate from Irish moss is also known by other trade names such as "carrageen," "carragar" or "krim-ko-gel." For the purpose of description, the product will be herein designated Irish moss gel.

Other vegetable gels such as "agar-agar" do not appear to be as satisfactory as the Irish moss gel, possibly due to the fact that the latter has a relatively high content of sea water mineral matters which may be at least partially responsible for its effectiveness as a colloidal dispersing agent for the lecithin. Lecithin mixed with Irish moss gel forms a light, dry powder which can be readily, uniformly and intimately mixed with either dry or wet baking constituents to form a complete intimately dispersed emulsion therewith.

Experiments indicate that the Irish moss gel will absorb one-half its volume of lecithin and still retain its dry powdery form. Therefore, the preferred composition of the improved lecithin compound for dry work, such as flour mixtures is two parts Irish moss gel to one part lecithin by volume.

The above compound is mixed directly with the flour for bakery work in the proportion of approximately three per cent by weight of shortening added. For instance, if the given dough mix is to contain ten pounds of shortening approximately three-fourths of an ounce of the improved lecithin compound should be added for optimum results. More can be added without affecting the final result but the additional appears to be wasted. Less can be added with proportional results.

The action appears to be that the Irish moss gel acts as a colloidal carrier for the lecithin and distributes the latter completely and uniformly throughout the dough mass in microscopic dispersion. The highly dispersed lecithin then acts in its usual capacity as a dispersing agent for the shortening, yeast, syrup and other ingredients in the dough to obtain maximum results from each.

For certain uses a wet mixture may be desirable. This can be obtained by simply mixing the improved lecithin compound with water and/or with animal or vegetable oils. Lecithin is difficultly soluble in water or oils but the improved lecithin compound is readily soluble therein. It therefore forms an ideal method for introducing lecithin in food shortenings, preserves, peanut butters, candies, etc.

An ideal shortening compound for food uses can be made by intermixing the improved lecithin compound with water and animal fats to form an oily liquid emulsion.

It appears that the Irish moss gel encloses or tenaciously holds the lecithin during the mixing stages of the dough to prevent loss of surface tension and the resulting heaviness of the dough. The temperature of baking, however, causes the Irish moss gel to release the lecithin at the proper time to produce optimum results.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A composition of matter consisting of lecithin interpersed and suspended in dry Irish moss gel.

2. A lecithin composition consisting of approximately two parts dry Irish moss gel and one part lecithin intermixed to form a substantially dry powder.

3. A lecithinated food product comprising lecithin absorbed in dry, powdered Irish moss gel, the quantity of lecithin being insufficient to destroy the dry, powdery character of the gel.

4. A process of preparing a lecithinated food product in the form of a loose, dry, free-flowing powder which comprises intermixing lecithin with Irish moss gel in the dry state.

5. A process of preparing a dry, lecithinated food product comprising intermixing dry, powdered Irish moss gel with lecithin, the quantity of lecithin being kept below the absorption ability of the gel so that the resulting compound retains the dry, powdery, free-flowing characteristics of the dry, powdered gel.

WILBER J. ALLINGHAM.

REFERENCES CITED

The following references are of record in the file of this patent:

UNITED STATES PATENTS

| Number | Name | Date |
|---|---|---|
| 1,553,294 | Baker | Sept. 8, 1925 |
| 1,859,240 | Jordon | May 17, 1932 |
| 2,057,695 | Schwieger | Oct. 20, 1936 |
| 2,201,064 | Thurman | May 14, 1940 |
| 2,334,401 | Fitzpatrick et al. | Nov. 16, 1943 |